United States Patent [19]

Chen

[11] Patent Number: 4,685,388

[45] Date of Patent: Aug. 11, 1987

[54] DEVICE TO REMOVE PEANUTS FROM THE ROOT THEREOF

[75] Inventor: Chang C. Chen, Hsin-Chu, Taiwan

[73] Assignee: Industrial Technology Research Institute, Chu Hsien, Taiwan

[21] Appl. No.: 829,994

[22] Filed: Feb. 18, 1986

[51] Int. Cl.⁴ ............................................. A23N 15/00
[52] U.S. Cl. ........................................ 99/641; 99/635; 99/643; 171/28
[58] Field of Search ................ 99/546, 635, 637, 638, 99/639, 640, 641, 643; 171/1, 26–28, 31

[56] References Cited

U.S. PATENT DOCUMENTS

| | | | |
|---|---|---|---|
| 2,476,336 | 7/1949 | Urschel | 99/643 |
| 3,307,599 | 3/1967 | Vacca et al. | 99/643 |
| 3,527,304 | 9/1970 | Wilde et al. | 171/28 |
| 3,541,979 | 11/1970 | Lorenzen | 171/28 |
| 3,552,398 | 1/1971 | Looker | 171/28 |
| 3,989,110 | 11/1976 | Medlock et al. | 171/28 |
| 4,607,703 | 8/1986 | Wang | 171/27 |

Primary Examiner—Timothy F. Simone
Attorney, Agent, or Firm—Wenderoth, Lind & Ponack

[57] ABSTRACT

A device to remove the pod peanuts from the root thereof. The device mainly comprises a stem and leaf conveying mechanism and a pod peanut rubbing and conveying mechanism. The two mechanisms hold the stem and leaf portion and the pod peanut portion respectively, and twist the two portions simultaneously so as to cause the pod peanuts to separated from the root of peanut plant. The stem and leaf conveying mechanism includes a sliding member and a driving member; the pod peanut rubbing and conveying mechanism includes a fixed rubbing member and a rotary rubbing member. Both of the two mechanisms are driven with a driving power so as to provide almost an equal conveying speed for the stem and leaf portion and the pod peanut portion.

18 Claims, 6 Drawing Figures

DEVICE TO REMOVE PEANUTS FROM THE ROOT THEREOF

BACKGROUND OF THE INVENTION

This invention relates to a device to remove peanuts from the root thereof; particularly, the device comprises two sets of mechanisms to be operated simultaneously to hold the stem and leaf portion and the pod peanut portion respectively so as to generate a relative twisting function to cause the pod peanuts to be separated from the root thereof.

Currently, during harvesting peanuts by means of either a machine or manpower, the peanut plant has to be picked up first, and then the pod peanuts are separated from the root thereof. The manual method of removing the pod peanuts from the root is rather slow in terms of efficiency. In the current machines for removing the pod peanuts, there is one which holds the stem and leaf portion, and then rotate an iron or steel wire at a high speed so as to beat the pod peanuts off the root. There is another kind of machine, which comprises a high speed rotating cylinder and a plurality of nets or iron wires around the cylinder. In operation, the peanut plant is thrown upon the rotating cylinder; as a result of the centrifugal force, the pod peanuts will be pulled off; however, the aforesaid mechanical devices have a common disadvantage of often breaking the pod peanuts, which may adversely affect the quality of the peanuts, or even may give rise to *aspergillus flavus*.

SUMMARY OF THE INVENTION

It is the prime object of the present invention to provide a device for removing the pod peanuts from the root thereof without damaging the pod peanuts, or to minimize the rate of damage in removing the pod peanuts.

It is another object of the present invention to provide a pod peanut-removing device, which can be operated simply from the input and output of the peanut plants and continuously at a higher mechanical efficiency.

The mechanical method of removing the pod peanuts from the root thereof with the device of present invention is derived from the manual method of removing the pod peanuts, i.e. being similar to holding the stem and leaf partion with one hand, and holding the pod peanuts with the other hand, and twisting the peanuts until being removed. In order to have the machine operate simple and continuously, the device according to the present invention has two sets of continuously rotating mechanisms to hold the stem and leaf portion and the pod peanut portion respectively and to move along a given passage. The stem and leaf portion is merely conveyed in a still manner, while the pod peanuts are conveyed and rubbed simultaneously; the pod peanuts will all be removed from the root thereof upon passing through the inlet and the outlet of the conveying passage.

The stem and leaf conveying mechanism comprises a sliding member and a rotary driving member; the driving member is substantially a round wheel or an endless link belt mounted on several sprockets, being driven with a driving means. The outer surface of the driving member is a rubbing surface with several grooves or flanges so as to fit closely against the surface of the sliding member. Upon a stem and leaf portion being fed into the inlet of the device, the driving member will convey that portion to the outlet automatically.

The sliding member has a smooth surface or a set of smooth guide wires, being fixedly mounted in the opposite side of the rubbing surface of the driving member to form an inlet, and outlet, and a conveying passage respectively. The sliding member and the driving member are mounted closely against each other by means of an external spring member or an elastic force of themselves so as to provide an adequate holding force to the stem and leaf portion during the conveying process. The sliding member may be an endless link belt mounted around several sprockets to be driven idly by the driving member so as to minimize the conveying resistance.

The pod peanut rubbing an conveying mechanism is installed in parallel with a suitable space under the stem and leaf conveying mechanism. The inlets, outlets and the conveying passage of the two mechanisms are in the same corresponding positions respectively so as to feed the whole peanut plant into the device simultaneously. The rubbing and conveying mechanism comprises a fixed rubbing member and a rotary rubbing member; the rotary rubbing member may be a round wheel or an endless belt mounted around several sprockets, being driven with a driving means. The outer surface of the rotary rubbing member is a rubbing surface being furnished with grooves or flanges so as to fit with the rubbing surface of the fixed rubbing member. Upon the pod peanut portion being fed into the inlet, the pod peanuts will move along the conveying passage between the two rubbing members. The rubbing and conveying speed of the pod peanut portion will be about the same as that of the stem and leaf portion.

The fixed rubbing member is fixedly mounted on the opposite side of the rubbing surface of the rotary rubbing member to form a conveying passage, an inlet and an outlet. The both rubbing surfaces of the fixed rubbing member and the rotary rubbing member are made of soft and frictional material, such as an inflated tube member or a foam material. That material will provide a soft rubbing and pressing effect to the pod peanuts so as to twist and break the fine root portion that links the pod peanuts.

DETAILED DESCRIPTION OF THE PREFERRED EMBODIMENTS

Figure 1:
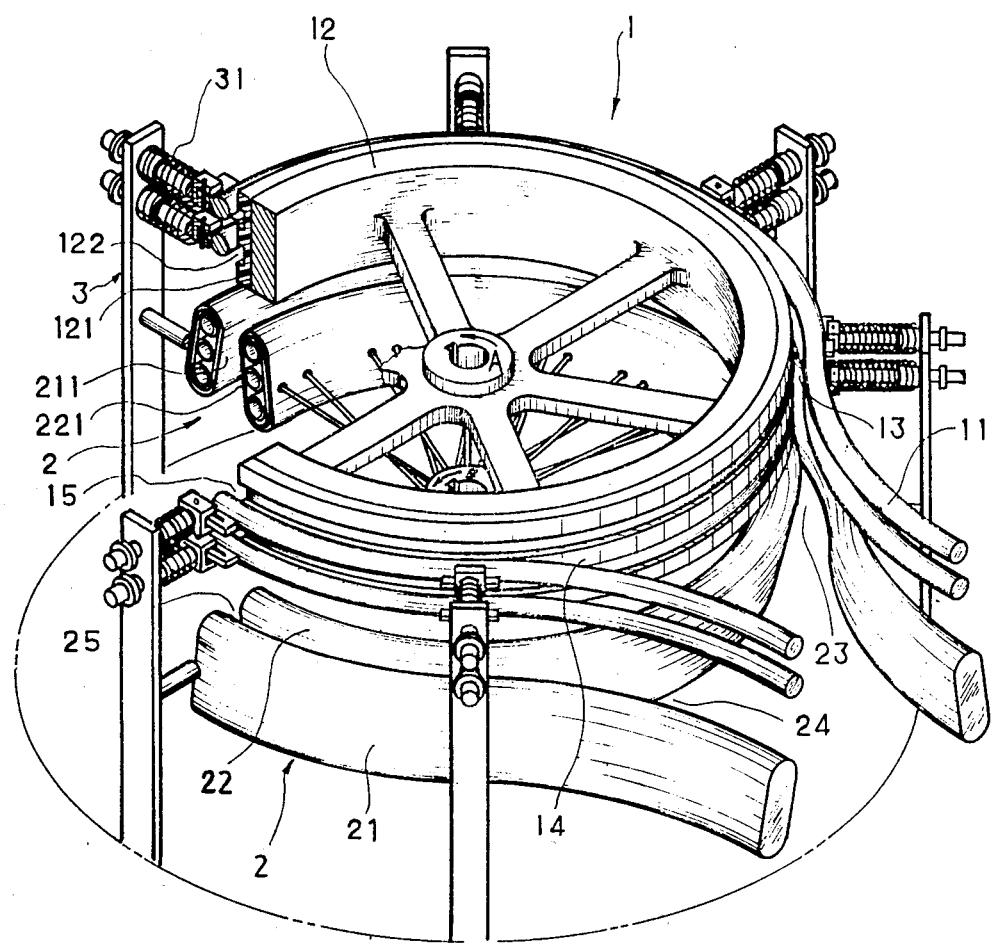
FIG. 1 is a perspective and fragmental sectional view of a first embodiment of the present invention.
Figure 2:
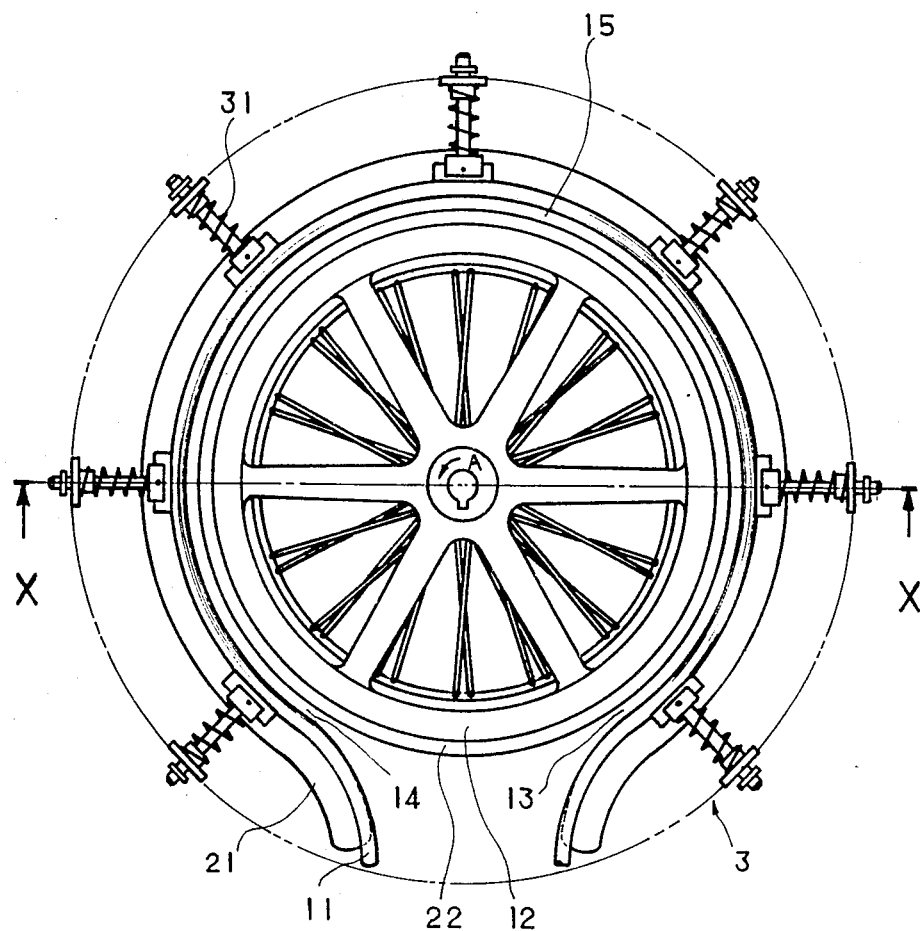
FIG. 2 is a top view of the embodiment shown in FIG. 1.

Referring to FIGS. 1 and 2, there is shown a perspective view of a first embodiment of the present invention, which mainly includes a stem and leaf conveying mechanism 1 and a pod peanut rubbing and conveying mechanism 2. The stem and leave conveying mechanism 1 substantially comprises a sliding rail assembly 11 and a driving wheel member 12. The sliding rail assembly 11 is made of two smooth wires mounted in parallel on the frame 3 and in a radially moving manner towards and closely against the driving wheel member 12 by means of a plurality of spring members 31. The driving wheel member 12 is substantially a round wheel to be driven by the shaft thereof (the driving means not being shown). According to the rotating direction as shown by an arrow "A", the sliding rail assembly 11 and the driving wheel member 12 form an inlet 13 for feeding the stems and leaves of peanuts, an outlet 14, and a conveying passage 15 therebetween. The holding surface 121 of the driving wheel member 12 is furnished with grooves 122 to increase the holding force.

Figure 3:
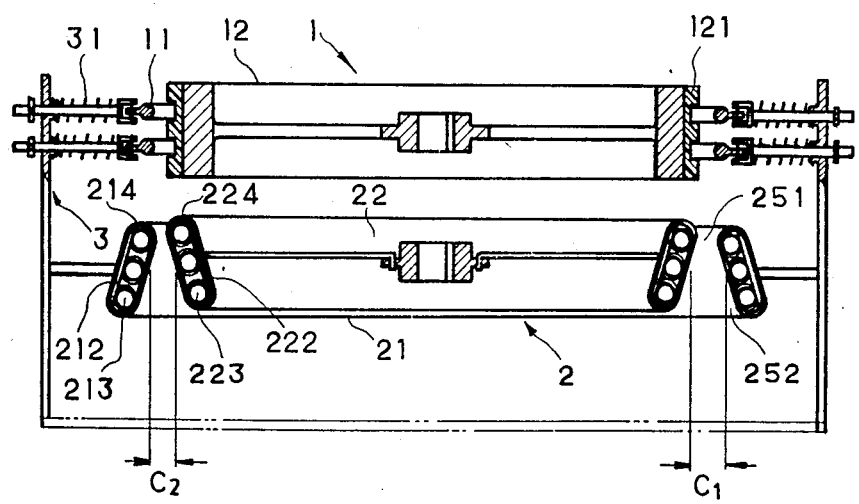
FIG. 3 is a sectional view taken from line X—X in FIG. 2.

The pod peanut rubbing and conveying mechanism 2 comprises a fixed rubbing member 21 and a rotary rubbing member 22. The pod peanut rubbing and conveying mechanism 2 is installed in parallel with the stem and leaf conveying mechanism, and has a corresponding inlet 23 and outlet 24, and a conveying passage 25. As shown in FIG. 2, the fixed rubbing mechanism 21 is mounted on frame 3. The rotary rubbing member 22 is substantially a round wheel to be driven by the shaft thereof (the driving means not being shown). The rotary rubbing member 22 rotates counter-clockwise as shown with the arrow "B". Both rubbing surfaces 211 and 221 of the two rubbing members 12 and 22 are made of soft and frictional material. Referring to FIG. 3, there is shown a sectional of FIG. 2, in which the rubbing members are shown to be made of several inflated tube members 213 and 223 being mounted on the base plates 212 and 222 respectively, and being covered with soft rubber sleeves 214 and 224. The width of the holding surface is wide enough that it can sufficiently cover the pod peanuts portion to be processed. The top gap 251 formed by the two rubbing surfaces 211 and 221 (i.e. the conveying passage) becomes wider gradually in the direction of the bottom gap 252 so as to provide a mechanical function to remove the pod peanuts from the root portion of peanut plant. The average gap width from the inlet to the outlet becomes narrower and narrower slightly as shown by C1>C2 in FIG. 3 because of the number of pod peanuts to be removed from the root portion becoming less gradually.

Figure 4:
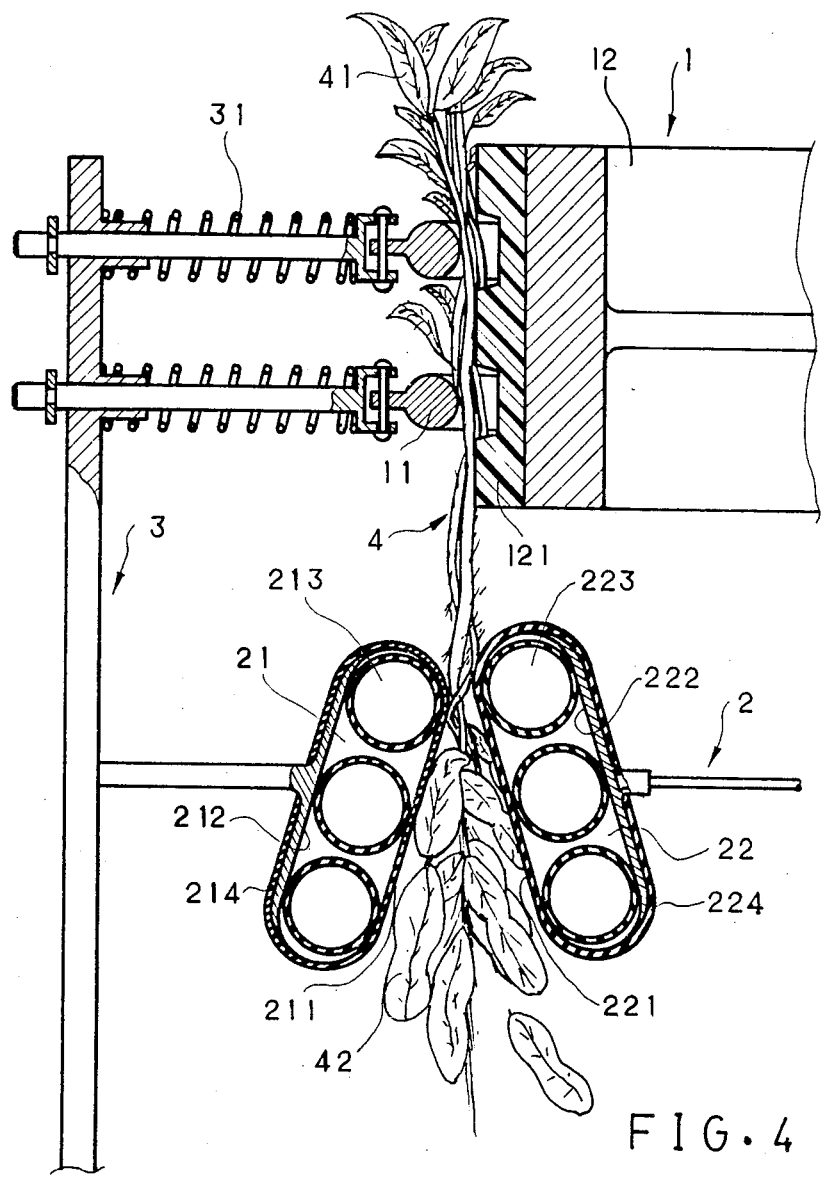
FIG. 4 is a fragmental sectional view of the first embodiment, showing the whole peanut plant being fed into the device for removing the pod peanuts.

FIG. 4 illustrates the conveying speeds of the peanut plant 4 in the stem and in leaf conveying mechanism 1 and the pod peanut rubbing and conveying mechanism 2 are almost equal to each other, i.e., the conveying speed of the stem and leaf portion 41 is approximately equal to that of the pod peanuts 42; in that case, the linear speed of the rubbing surface of the rotary rubbing member 22 is approximately two times of that of the holding surface of the driving wheel member 12. In this embodiment, the rotary rubbing member 22 and the driving wheel member each have a round wheel portion with about the same radius, and therefore the rotating speed of the rotary rubbing member 22 is equal to two times of that of the driving wheel member 12 so as to let the pod peanuts 42 generate a rotation and revolution; the revolution speed is the conveying speed of the peanut plant 4, while the rotation will generate a twisting function between the pod peanuts 42 and the stem and leaf portion 41 so as to remove the pod peanuts from the stems. Owing to the pod peanuts 42 being in an irregular arrangement and being removed irregularly, the rubbing and conveying speed is not quite stable (i.e., being more or less than the conveying speed of the stem and leaf portion 41); as a result, that case would be useful in delaying the holding speed and distance between the two portions so as to facilitate removing the pod peanuts from the plant roots.

Figure 5:
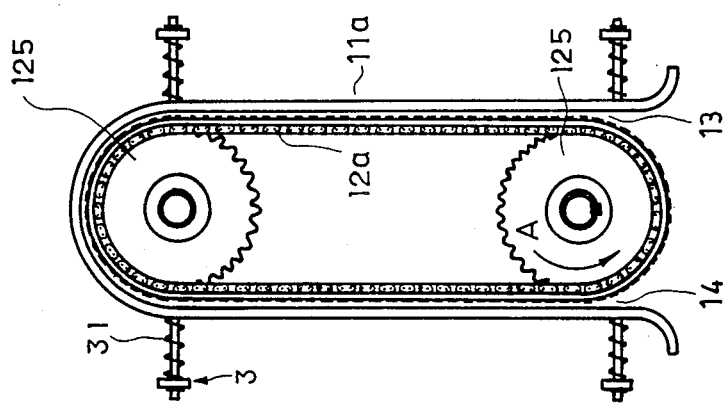
FIG. 5 is a top view of a second embodiment of a stem and leaf conveying mechanism of the present invention.

Referring to FIG. 5, there is shown another embodiment of the stem and leaf conveying mechanism according to the present invention. In FIG. 5, the driving member 12a is substantially an endless link belt movably mounted around several sprockets 125. The sliding member 11a is substantially a smooth and flat surface mounted on the frame 3 in a radially movable manner and being furnished with a holding force against the driving member 12a by means of several springs 31.

Figure 6:
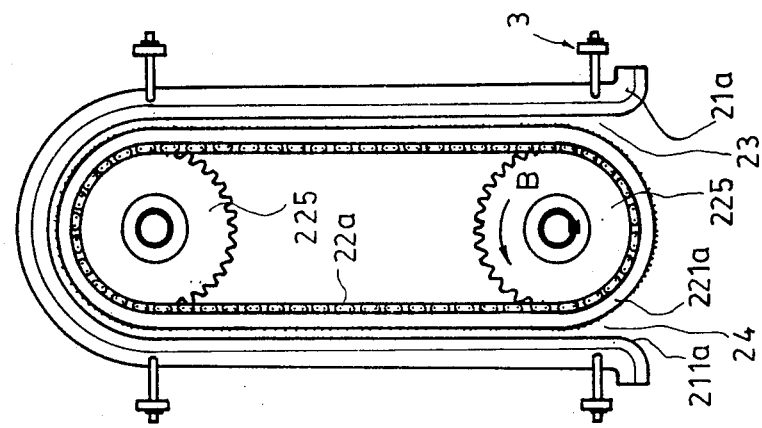
FIG. 6 is a top view of a second embodiment of a pod peanut rubbing and conveying mechanism of the present invention.

Referring to FIG. 6, there is shown another embodiment of the pod peanut rubbing and conveying mechanism of the present invention, in which the rotary rubbing member 22a is an endless belt mounted over several sprockets 225 in a rotatable manner. The outer rubbing surface 221a of the rotary rubbing member 22a is made of a soft and frictional foam material; the fixed rubbing member 21a is fixedly mounted on the frame 3. The outer rubbing surface 211a of the fixed rubbing member 21a is also made of a foam material or may have a plurality of grooves or flanges to increase friction.

According to the aforesaid description, it is apparent that the present invention mainly comprises two sets of processing mechanisms to hold the stem and leaf portion and the pod peanut portion respectively and to provide a relative twisting function for removing the pod peanuts. The pod peanuts are to be held tenderly and softly by the structure of the present invention so as to prevent them from being damaged. Since the operation of the aforesaid processing mechanism is a simple and continuous operation, the structure thereof is simple, but is effective in operation; it is deemed valuable in industrial utilization.

It is expected that the aforesaid description and the drawings which illustrate the preferred embodiments of the present invention, may be changed, modified or added without deviating from the spirit and scope of the present invention; therefore, the present invention can only be limited by means of the claims attached hereto.

I claim:

1. A device for removing pod peanuts from a root thereof, comprising:

a stem and leaf conveying mechanism including a driving member and a sliding member resiliently mounted around said driving member so as to define a horizontal stem and leaf conveying passage therebetween, said sliding member comprising means for resiliently holding the stem and leaf portion of a peanut plant against said driving member such that movement of said driving member along said stem and leaf conveying passage conveys the stem and leaf portion of peanut plant along said stem and leaf conveying passage;

a pod peanut rubbing and conveying mechanism under said stem and leaf conveying mechanism, said pod peanut rubbing and conveying mechanism including a rotary rubbing member and a fixed rubbing member mounted around said rotary rubbing member so as to define a horizontal pod peanut twisting and conveying passage therebetween in parallel to said stem and leaf conveying passage, for twisting and conveying pod peanuts on the roots of the peanut plant while the stem and leaf portion of the peanut plant is being conveyed along said stem and leaf conveying passage in rubbing engagement with said rotary rubbing member and said fixed rubbing member; and means for driving said driving member and said rotary rubbing member so as to twist the pod peanut portion relative to the stem and leaf portion with said rotary rubbing member so as to twist the pod peanuts from the roots thereof while concurrently conveying said stem and leaf portion and said peanut pod portion along said stem and leaf conveying passage and said pod peanut twisting and conveying passage, respectively.

2. A device as claimed in claim 1, wherein said driving member of said stem and leaf conveying mechanism is substantially a round wheel.

3. A device as claimed in claim 1, wherein said driving member of said stem and leaf conveying mechanism is an endless link belt mounted over several sprockets.

4. A device as claimed in claim 1, wherein the outer surface of said driving member is a rubbing surface having several protrusions.

5. A device as claimed in claim 1, wherein said sliding member of said stem and leaf conveying machanism in fixedly mounted around the outer surface of said driving member to form said stem and leaf conveying passage having an inlet and an outlet at opposite ends thereof.

6. A device as claimed in claim 5, wherein said fixed rubbing member of said pod peanut rubbing and conveying mechanism is fixedly mounted around the outer surface of said rotary rubbing member so as to form a gap therebetween defining said pod peanut twisting conveying passage having an inlet and an outlet at opposite ends thereof.

7. A device is claimed in claim 1, wherein said sliding member has a smooth inner guide surface for slidingly engaging the stem and leaf portion.

8. A device as claimed in claim 1, wherein said sliding member includes several smooth guide wires.

9. A device as claimed in claim 1, wherein said sliding member and said driving member are in close contact with each other by means of an external spring members.

10. A device as claimed in claim 1, wherein said rotary rubbing member of said pod peanut rubbing and conveying mechanism is a round rotary wheel.

11. A device as claimed in claim 1, wherein the rotary rubbing member of said pod peanut rubbing and conveying mechanism is an endless belt mounted around several sprockets.

12. A device as claimed in claim 1, wherein said fixed rubbing member of said pod peanut rubbing and conveying mechanism is fixedly mounted around the outer surface of said rotary rubbing member so as to form a gap therebetween defining said pod peanut twisting conveying passage having an inlet and an outlet at opposite ends thereof.

13. A device as claimed in claim 1, wherein the outer peripheral surface of said rotary rubbing member and said driving member are vertically aligned and the linear spped of said rotary rubbing member is approximately two times that of said driving member.

14. A device as claimed in claim 12, wherein the width of said gap increases in a downward direction from a side adjacent to said stem and leaf conveying mechanism to a side opposite said stem and leaf conveying passage.

15. A device as claimed in claim 12, wherein said gap reduces gradually in width from said inlet toward said outlet of said pod peanut twisting and conveying passage.

16. A device as claimed in claim 1, wherein said rotary rubbing member and said fixed rubbing member have opposing rubbing surfaces made of a soft and frictional.

17. A device as claimed in claim 16, wherein said rubbing surfaces are supported on several inflated tube members.

18. A device as claimed in claim 16, wherein said rubbing surface includes several protrusions.

* * * * *